US005528911A

United States Patent [19]

Roth et al.

[11] Patent Number: 5,528,911

[45] Date of Patent: Jun. 25, 1996

[54] HYDRAULIC CONTROL APPARATUS FOR A PLURALITY OF USERS

[75] Inventors: Dieter Roth, Schlüchtern; Mikko Erkkilä, Horb/Neckar, both of Germany

[73] Assignee: Mannesmann Rexroth GmbH, Lohr, Germany

[21] Appl. No.: 42,012

[22] Filed: Apr. 2, 1993

[30] Foreign Application Priority Data

| | | | |
|---|---|---|---|
| Apr. 4, 1992 | [DE] | Germany | 42 11 314.8 |
| Mar. 13, 1993 | [DE] | Germany | 43 08 004.9 |

[51] Int. Cl.[6] .................... F16D 31/02

[52] U.S. Cl. .................... 60/452; 60/445

[58] Field of Search .................... 60/445, 452

[56] References Cited

U.S. PATENT DOCUMENTS

| | | | |
|---|---|---|---|
| 5,046,309 | 9/1991 | Yoshino | 60/452 |
| 5,295,795 | 3/1994 | Yasuda et al. | 60/445 |

FOREIGN PATENT DOCUMENTS

| | | | |
|---|---|---|---|
| 513360 | 11/1993 | European Pat. Off. | 60/445 |
| 72073 | 6/1977 | Japan | 60/452 |
| 275902 | 11/1989 | Japan | 60/445 |
| 285302 | 10/1992 | Japan | 60/445 |

*Primary Examiner*—F. Daniel Lopez

*Attorney, Agent, or Firm*—Cushman, Darby & Cushman

[57] ABSTRACT

The present invention provides for a control apparatus for independently operating at least two users. The users can be the tilt cylinders and the lift cylinders of a loader. The control apparatus provides for the adjustment of the control valves and for the adjustment of the pressure control apparatus of the variable displacement pump means in dependency of each other. In accordance with the invention, the control position of the control spool of the control valve controlling the user with the largest load provides for a measure (or for the adjustment) of the pressure control device of the variable displacement pump. In this manner an extremely effective and economic operation of the hydraulic system comprising the control apparatus and the users is obtained.

3 Claims, 5 Drawing Sheets

HYDRAULIC CONTROL APPARATUS FOR A PLURALITY OF USERS

FIELD OF THE INVENTION

This invention relates to a hydraulic control apparatus for the independent acuation of at least two users or hydraulic loads like for instance the tilt cylinder(s) and lift cylinder(s) of loaders. The control of said users occurs by means of control valves having control spools which can be adjusted or moved into different control positions, and wherein the source of pressure medium comprises a variable displacement pump with an adjustable pressure regulating device assigned thereto.

BACKGROUND OF THE INVENTION

Control apparatus of the above outlined type are known. For an example of such a control apparatus the pressure control device is typically adjusted to a certain value which corresponds to the maximum admissable user pressure. If, for instance, a user like a tilt cylinder or a lift cylinder of a loader is moved until its abutment position is reached and if the cylinder is held in this position, then the pump destrokes and thus reduces its volume flow so far that the maximum set or adjusted value of the pressure at the pressure controller is maintained. This is done independently whether there is a need or no need to have such a high pressure available for the user in this state of operation.

SUMMARY OF THE INVENTION

It is an object of the present invention to provide a control apparatus as set forth above such that during operation of a hydraulic system comprising the control apparatus and the users only such a pump pressure is provided which is required for the proper functioning of the users at the respective moment of their operation.

In accordance with the present invention a hydraulic control apparatus for the independent operation of at least two users comprises: control valve means for controling said users, control spool means in said control valve means adapted to be adjusted or moved into controllable control positions, a source of pressure medium comprising at least one variable displacement pump with an appropriate pressure control device, wherein the adjustment or control of said control valve means and the adjustment or control of said adjustable pressure regulating device of the variable displacement pump are related to each other, and wherein the control position of the control spool means of the control valve means controlling the user providing the largest load provides a measure for the adjustment or control of the adjustment pressure regulating device for the variable displacement pump.

Due to the fact that the pressure adjustment of the adjustable pressure regulating device or pressure controller for the pump occurs depending on the control position of the control spool of the control valve for the user providing the largest load, an actuation of the control valves provides for a simultaneous respective adjustment of the pressure controller, such that the conditions necessary for the actuation of the users exist. The control valve spool of the control valve for the largest load has to be moved into the direction of opening in an extent until the pressure controller guarantees a pressure built up by the pump which corresponds to the load. The speed or rate with which said user is actuated is not defined by the opened opening cross section of the respective control valve but by the control or adjustment of the pressure controller for the variable displacement pump, wherein the adjustment or control of said pressure controller depends on the adjustment or control of the opening cross section of the respective control valve.

In case the control spools are in their initial position, then no control signal is supplied to the pressure controller of the pump. In this state or mode of operation the pressure controller is only under the influence of the small force of the largely slackened control spring. Thus, the pump operates with the minimum volume flow corresponding thereto against the predetermined pressure given by the low bias of the control spring. Thus, a very effective and economical operation of the hydraulic apparatus is achieved.

Further features of the invention may be gathered from the dependend claims.

DETAILED DESCRIPTION OF PREFERRED EMBODIMENTS

Figure 1:
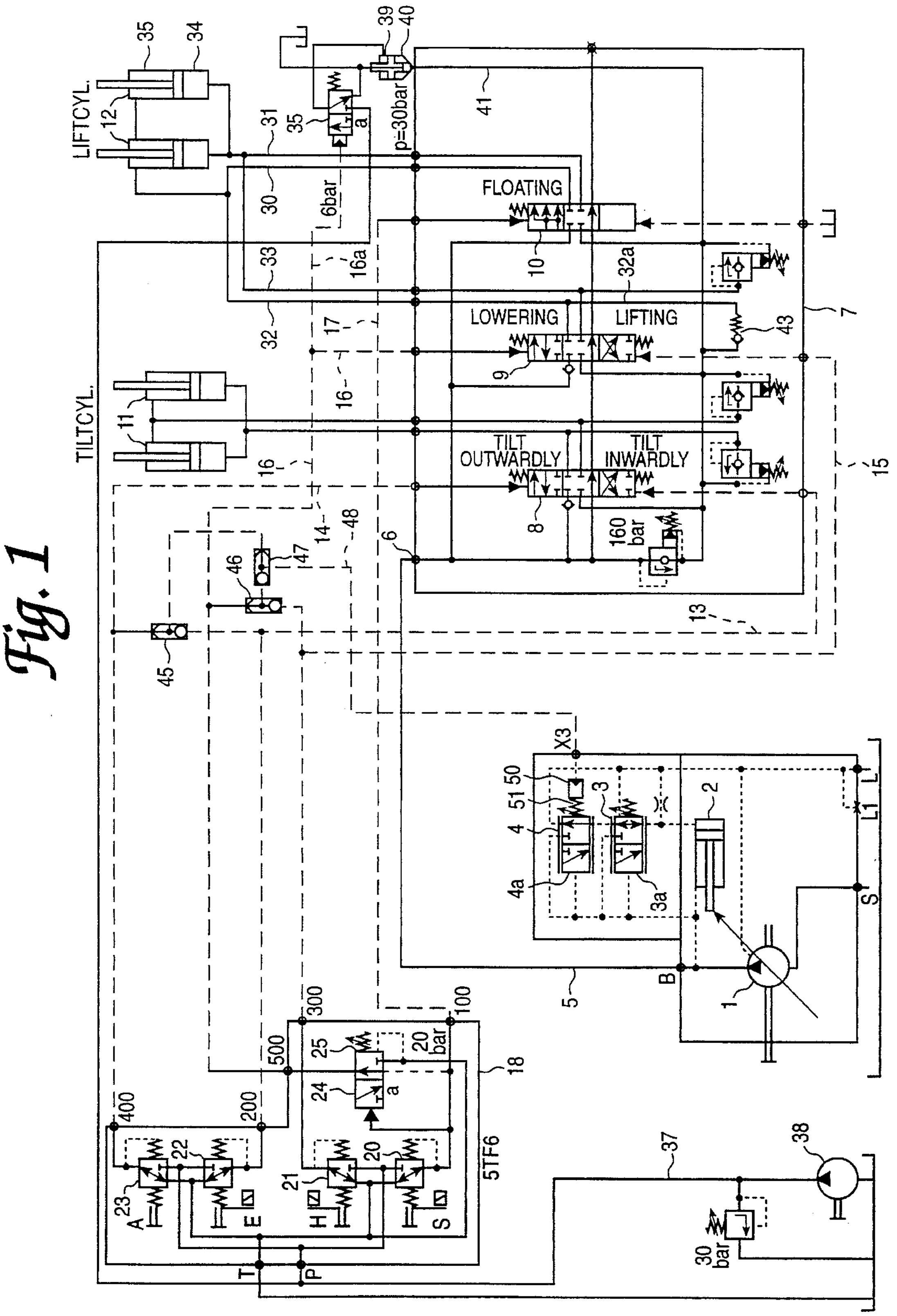
FIG. 1 shows a circuit diagram of a first embodiment of a hydraulic control apparatus.

In FIG. 1 a first embodiment of a hydraulic control apparatus is shown. The hydraulic control apparatus can be used for instance for a loader of which each two working cylinders, i.e. tilt cylinders 11 and lift cylinders 12 are shown. Reference numeral 1 refers to a variable displacement pump together with a control cylinder 2 by means of which the displacement of the pump can be varied. Reference numeral 4 relates to an adjustable pressure regulator or pressure controller and reference numeral 3 relates to a volume flow controller.

A pressure conduit 5 leads from pump 1 to an inlet 6 of a control block 7. The control block 7 comprises three control spool means 8, 9 and 10 which cooperate with respective recesses in the control block 7 so as to define directional control valves. Said directional control valves are adapted to control the working cylinders 11, 12 which in turn actuate a load means for instance a bucket, shovel or beam of, for instance, a loader. The control spools 8, 9 and 10, respectively, are connected via control conduits 13, 14, 15, 16 and 17, respectively, to the respective ports 200, 400, 300, 500 and 100 of a pilot control block 18. The pilot control block 18 comprises four pressure control valves (pressure reducing valves) 20, 21, 22 and 23. Further, a switching valve 24 is provided which directs the control pressure set at the pressure reducing valve 20 up to a certain amount via control conduit 16 to a control area or surface of the control spool 9. When a switching pressure, set by means of a spring 25, is exceeded, the switching valve 24 moves in the direction towards its switching position "a" and interupts the connection between the pressure control valve 20 and the control spool 9 which is provided by means of control conduit 16. In said switching position "a" of the switching valve 24, said conduit 16 is connected to tank. For a further increase of the control pressure which can be adjusted or set at the pressure control valve 20, the control spool 10 will be moved from the shown closed position into the open center position due to the connection of the control conduit 17 to the one control side of the control spool 10; in said open center position the working conduits 30, 31 leading to the lift cylinders 12 are connected to each other so that the lift cylinders are freely movable.

The operating or work movements of the lift cylinders 12 are controlled by means of the control spool 9. The control spool 9 is connected via work conduits 32, 33 to the work conduits 30, 31 and thus directly to the cylinder chambers 34, 35 of the lift cylinders 12.

A control conduit section 16*a* of the control conduit 16 leads to a switching valve 35. The switching valve 35 connects in its switched or actuated position "a" the pressure conduit 37 of a pilot oil pump 38 with the control chamber 39 of biasing valve 40, i.e. control pressure is applied to said chamber. Also, valve 40 blocks the connection between conduit 41 and tank. When pressure is applied to switching valve 35 via the pressure control valve 20, said pressure is also applied to the control spool 9 in the direction of "lowering". It should be noted that the biasing valve 40 which is located in the tank conduit 41. Thus, it is made sure that for a lowering of the lift cylinders 12 the pressure medium or operating liquid exiting from the cylinder chambers 34 will be held at a correspondingly high pressure which will guarantee—when a low pressure situation occurs in the spool side of the cylinder chambers 35 - a supply flow of working fluid via the check valve 43 from the tank conduit 41 into the conduit section 32 connected to the working conduit 32 and from the conduit section 32 to the piston rod side cylinder chambers 35.

The control conduits 13, 14, 15 and 16 are operationally coupled together by means of shuttle valves 45, 46 and 47, such that the control pressure acting in the output control conduit 48 of the shuttle valve 47 corresponds to the respective highest control pressure which acts on the pressure control valves 8, and 9. Said control pressure acts via the control conduit 48 on the biasing spool 50 for the control spring 51 of the pressure controller 4 and thus correspondingly biases the control spring 51. Thus, the respective highest control pressure for the actuation of the control spools 8 and 9 is a measure or indication for the pressure adjustment or pressure setting of the pressure controller 4.

If it is desired that one of the working cylinders 11 and 12, respectively, or both working cylinders 11 and 12 simultaneously assume a predetermined working position then for the respective pressure control valves a control pressure of such a level or amount is preset, that in the pump conduit 5 such a pressure may develop which will cause a respective operational movement of the working cylinders, while, at the same time, the control spools 8 and/or 9 will move into the respective control positions.

The control spool 10 does not participate in the pressure control of the pump, inasmuch as said control spool 10 is only supposed to cause an open center position (floating position). In the final analysis, said open center position replaces a fourth switching position for the control valve 9 for the lift cylinders 12. The control area or surface of the biasing spool 50 which is subjected to the control pressure is larger then the oppositely located control surface of the control spool 4*a* of the pressure controller 4, a control surface which is subjected to the pump pressure. Inasmuch as the forces acting upon the control spool 4*a* are the result of the product between the effective surface subjected to pressure and the respective control pressure a relatively large pump pressure can be controlled by means of the biasing spool 50 having a large pressure effective surface. The ratio of the control surface of the control spool 4*a* of the pressure controller 4 subjected to the pump pressure to the effective control surface of the biasing spool 50 is, for instance, in the order of magnitude of 1:8 up to 1:20. By means of this ratio of surfaces or areas a pressure adjustment of the pump can be achieved up to a maximum of 300 bar, said adjustment being carried out with the help of the pressure control valves, by means of which the control pressure of, for instance, a maximum of 30 bar can be set or adjusted. Depending on a specific application also a different ratio of areas or surfaces can be desirable. In case that high pressure is selected for the control or adjustment, then the ratio of surfaces can be 1:1.

Figure 2:
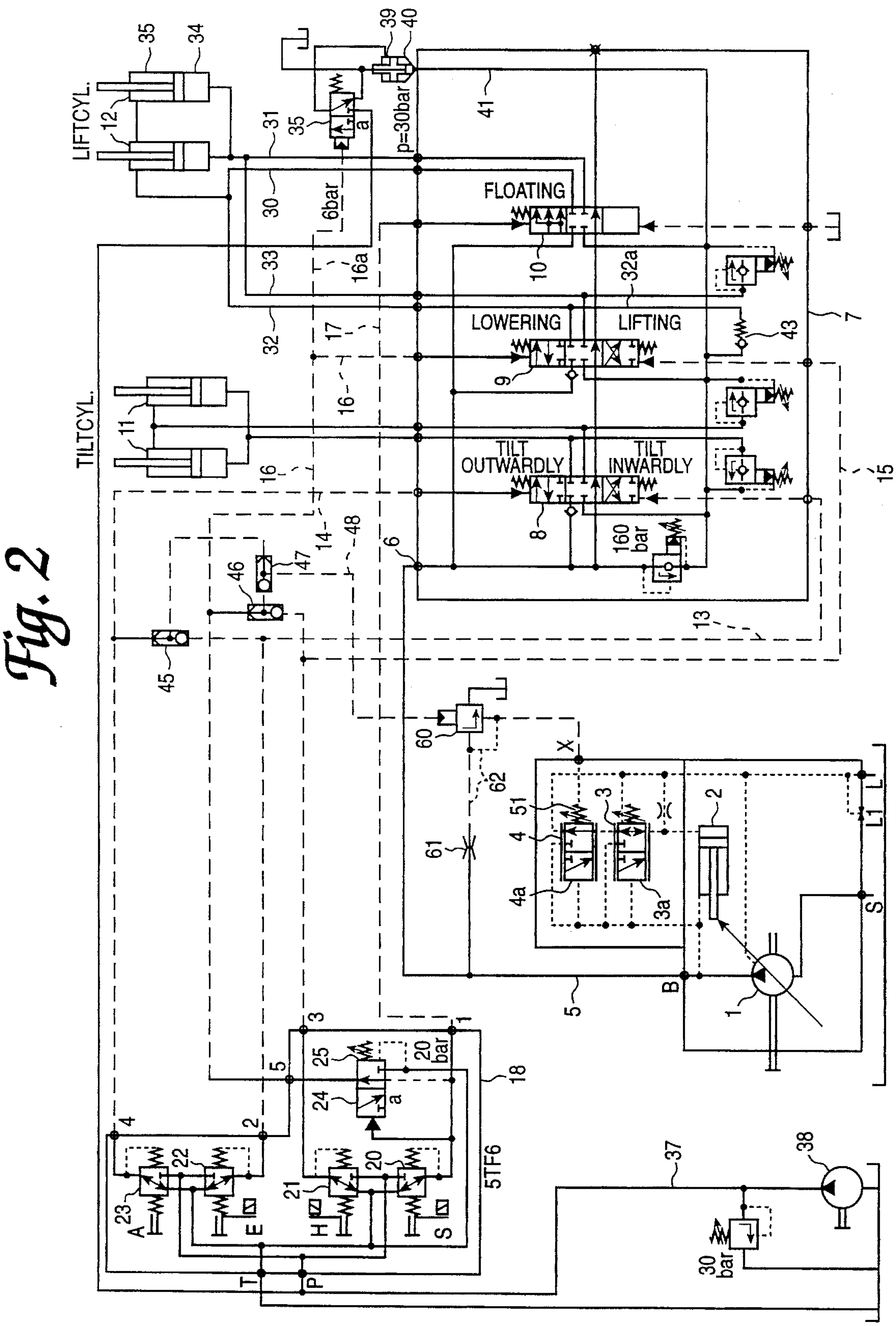
FIG. 2 shows a circuit diagram of a second embodiment of a control apparatus.

FIG. 2 shows another embodiment of the invention which differs from the embodiment of FIG. 1 only in the following respect: the highest control pressure existing in control conduit 48 is supplied not to the adjustable pressure regulator or pressure controller 4, but to a pressure relief valve 60 for its respective pressure adjustment. Control liquid is branched off the pressure conduit 5 of the pump and is supplied to the pressure controller 4 via a throttle 61 and a control conduit 62, wherein the pressure of the control liquid is determined by the pressure relief valve 60. For this arrangement the pressure controller which is used as a standard item for the pump can be maintained. It is only necessary to provide the pressure relief valve with a respective pressure intensifier.

Figure 4:
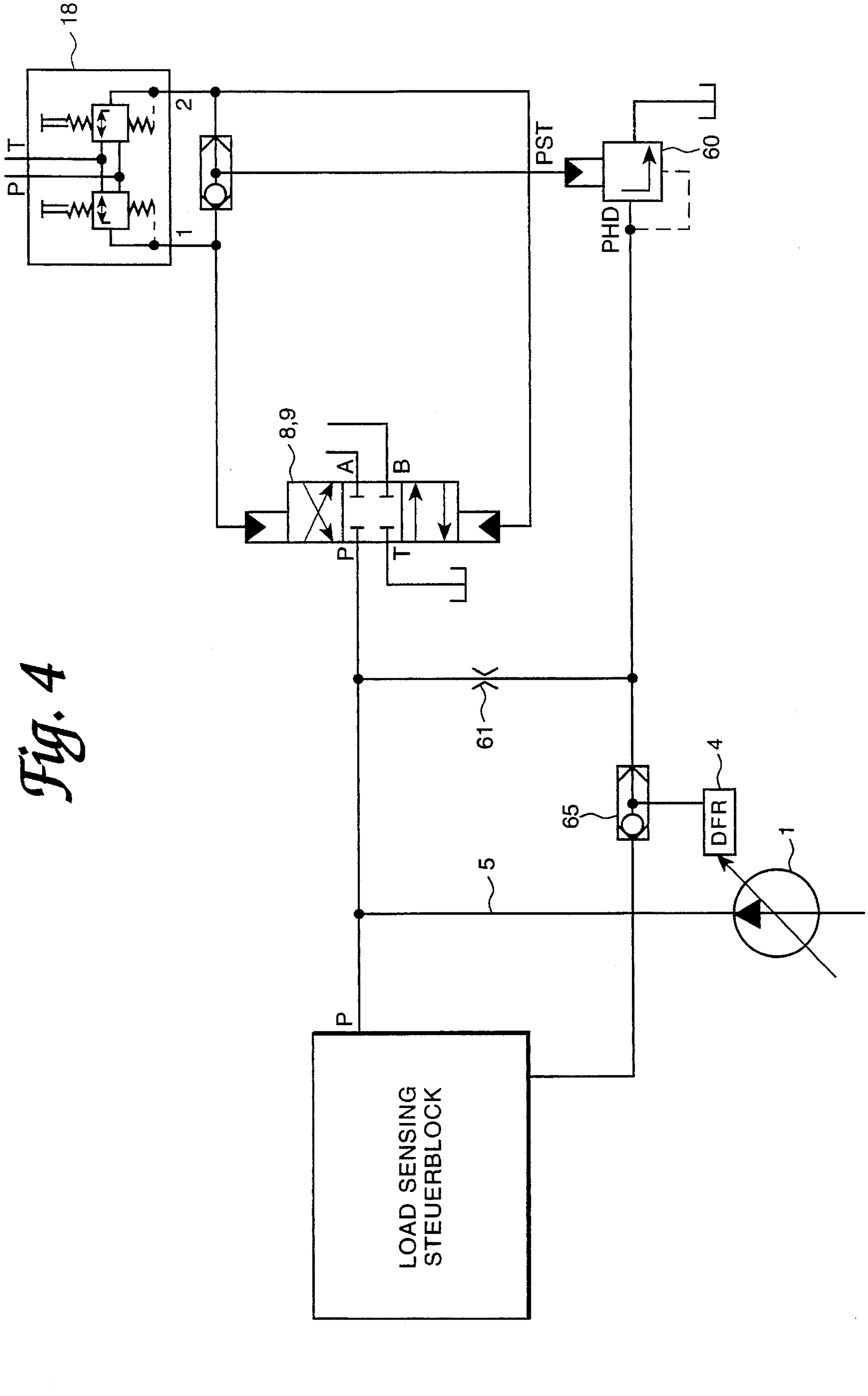
FIG. 4 shows a modification of the embodiment of FIG. 2.

By using the standard pressure controller, the following additional advantage results: a load pressure dependent control can cooperate with the control of the invention. The respective highest signal of the two controls will be supplied via a shuttle valve to the flow controller. This situation is shown schematically in FIG. 4. In FIG. 4 the pressure dependent control is referred to as load sensing, the pressure controller of the pump 1 is referred to by DFR and the shuttle valve is referred to by 65. Otherwise, the reference numerals of FIG. 4 correspond to those of FIG. 2.

Figure 3:
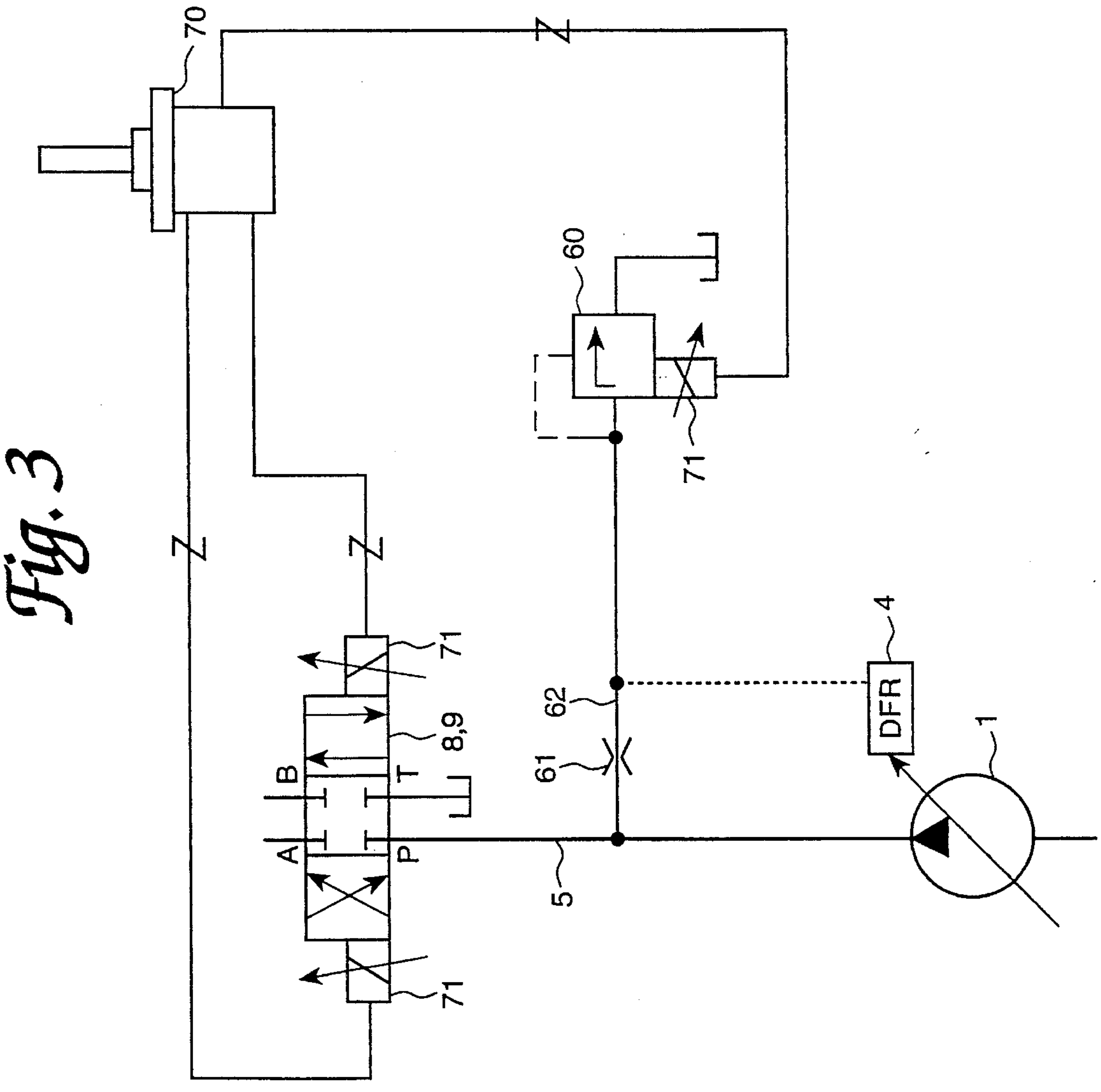
FIG. 3 shows a circuit diagram of a modification of the embodiment of FIG. 2.

The embodiment of FIG. 3 corresponds to the embodiment of FIG. 2, however, instead of hydraulic control means electric control means 70, 71 are used. The electric control means are in the form of control members 70 generating electric signals and electric actuating magnets are used for the control valves 8, 9 and the pressure reducing valve 60. Thus, FIG. 3 relates to an electric solution of the present problem.

Figure 5:
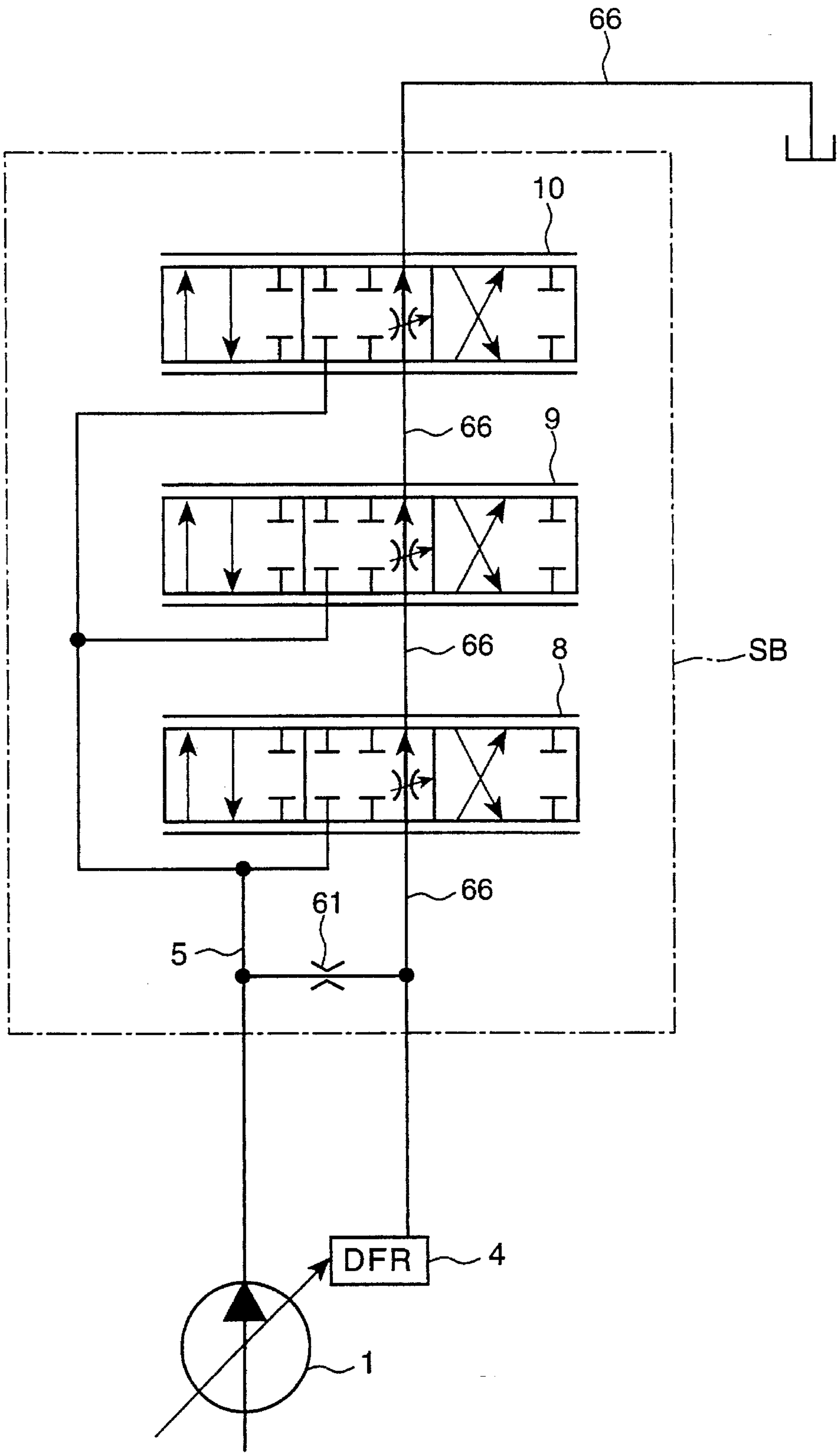
FIG. 5 is a circuit diagram of third embodiment.

FIG. 5 discloses another embodiment of the invention. According to this embodiment the control pressure for the pressure controller is provided by the design of the control edges of the control valves 8, 9 and 10 which cooperate with each other and control the circulation of the supplied liquid. The control valves 8, 9 and 10 are combined in a control block SB. The control edges of said control valves 8, 9 and 10 act like throttles, the flow cross section of which is changed due to the movement of the control spools. The larger the movement of the control spools the larger will be the throttle effect of the cooperating control edges of the control spools of the valves. Thus, in accordance therewith, the pressure, seen in the direction of flow, will increase in front of the throttles, wherein again the highest pressure will be determined by the control spool having the largest amount of movement or displacement.

As in the embodiments of FIG. 2 through 4, the control liquid (pressure medium) is taken via a throttle 61 from the pressure conduit 5 of the pump and is fed back to the tank via the circulating channel 66. For this kind of control pressure generation no additional valve apparatus is required for obtaining the control pressure and, indeed, the throttle 61 in the initial position of the directional control valves limits the maximum amount of pressure medium which can be returned from the pump to the tank via the circulation channel 66 in the control block SB. Also for this kind of control pressure generation, the control spool being moved or displaced the most, will determine the highest control pressure.

Summarizing it can be said that the present invention provides for a control apparatus for independently operating at least two users. The users can be the tilt cylinders and the lift cylinders of a loader. The control apparatus provides for the adjustment of the control valves and for the adjustment of the pressure control apparatus of the variable displacement pump means in dependency of each other. In accordance with the invention, the control position of the control spool of the control valve controlling the user with the largest load provides for a measure (or for the adjustment) of the pressure control device of the variable displacement pump. In this manner an extremely effective and economic operation of the hydraulic system comprising the control apparatus and the users is obtained.

What is claimed is:

1. A hydraulic control apparatus for the independent actuation of at least two users, said apparatus comprising:

at least one variable displacement pump forming a source of a pressure medium;

control valves to vary flow of the pressure medium between the at least one variable displacement pump and associated users of said at least two users, said control valves having respective control spools which are adapted to be moved into control positions; and an adjustable pressure regulator assigned to said at least one variable displacement pump, said adjustable pressure regulator regulating pressure of the pressure medium discharged from said at least one variable displacement pump, wherein an adjustment of the control valves and adjustment of the adjustable pressure regulator of the at least one variable displacement pump are dependent on each other, said adjustable pressure regulator being subjected to a pump pressure in a direction towards a smaller volume flow of the at least one variable displacement pump and said adjustable pressure regulator being further subjected to a respective highest control pressure which is used for controlling or actuating the control valves in a direction of a larger flow volume.

2. The hydraulic control apparatus of claim 1 wherein a control spring of the adjustable pressure regulator is in supporting engagement with a biasing spool, said biasing spool being adapted to be subjected to the respective highest control pressure used for controlling said control valves, and wherein said control spring is further correspondingly biased by said biasing spool.

3. The hydraulic control apparatus of claim 2, where an area of the biasing spool subjected to pressure is larger or equal to an area of a control spool of the adjustable pressure regulator which is subjected to the pump pressure.

* * * * *